United States Patent
Haun et al.

(10) Patent No.: US 6,532,424 B1
(45) Date of Patent: Mar. 11, 2003

(54) ELECTRICAL FAULT DETECTION CIRCUIT WITH DUAL-MODE POWER SUPPLY

(75) Inventors: Andy A. Haun, Cedar Rapids, IA (US); Robert F. Dvorak, Mt. Vernon, IA (US); Brett E. Larson, Cedar Rapids, IA (US); Brian Grattan, Cedar Rapids, IA (US); Kon B. Wong, Cedar Rapids, IA (US)

(73) Assignee: Square D Company, Palatine, IL (US)

( * ) Notice: Subject to any disclaimer, the term of this patent is extended or adjusted under 35 U.S.C. 154(b) by 0 days.

(21) Appl. No.: 09/546,510

(22) Filed: Apr. 11, 2000

Related U.S. Application Data

(63) Continuation-in-part of application No. 09/129,685, filed on Aug. 5, 1998, which is a continuation-in-part of application No. 09/026,193, filed on Feb. 19, 1998, which is a continuation-in-part of application No. 08/814,754, filed on Mar. 7, 1997, which is a division of application No. 08/600,512, filed on Feb. 13, 1996, now Pat. No. 5,682,101, which is a continuation-in-part of application No. 08/402,678, filed on Mar. 13, 1995, now abandoned, which is a continuation-in-part of application No. 08/402,600, filed on Mar. 13, 1995, now abandoned, which is a continuation-in-part of application No. 08/402,575, filed on Mar. 13, 1995, now abandoned, which is a continuation-in-part of application No. 08/403,084, filed on Mar. 13, 1995, now abandoned, which is a continuation-in-part of application No. 08/403,033, filed on Mar. 13, 1995, now abandoned.

(51) Int. Cl.$^7$ .............................................. G01R 31/00
(52) U.S. Cl. ...................... 702/58; 702/58; 702/117; 361/42; 361/59; 323/282; 323/283
(58) Field of Search .......................... 702/58, 117, 118, 702/122, 124, 126, 182, 57, 65; 361/63, 42

(56) References Cited

U.S. PATENT DOCUMENTS

| | | | |
|---|---|---|---|
| 2,808,566 A | 10/1957 | Douma | 324/127 |
| 2,832,642 A | 4/1958 | Lennox | 299/132 |
| 2,898,420 A | 8/1959 | Kuze | 200/87 |

(List continued on next page.)

FOREIGN PATENT DOCUMENTS

| | | |
|---|---|---|
| CA | 2267490 | 3/1999 |
| CA | 2256208 | 6/1999 |
| CA | 2256243 | 6/1999 |

(List continued on next page.)

OTHER PUBLICATIONS

Paolantonio, Antonio N., P.E., Directional Couplers, R.F. Design, pp. 40–49 (Sep./Oct. 1979).

Duenas, Alejandro J., Directional Coupler Design Graphs For Parallel Coupled Lines And Interdigitated 3 dB Couplers, RF Design, pp. 62–64 (Feb. 1986).

(List continued on next page.)

Primary Examiner—Marc S. Hoff
Assistant Examiner—Elias Dester
(74) Attorney, Agent, or Firm—Kareem M. Irfan; Larry I. Golden

(57) ABSTRACT

An arcing fault protection assembly and a corresponding method determine whether arcing is present in electrical circuits. The assembly powers-up quickly without dissipating excessive heat while power is being supplied to the assembly. The assembly comprises a sensor, a broadband noise circuit, a controller, and a dual-mode power supply. The sensor detects a current flowing in an electrical circuit and develops a corresponding sensor signal. The broadband noise circuit determines the presence of broadband noise in the sensor signal and produces a corresponding output signal. The controller processes the sensor signal and the output signal in a predetermined fashion to determine whether an arcing fault is present in the circuit. The dual-mode power supply supplies power to the sensor, broadband noise circuit and controller using a first mode and later switching to a second mode. The first mode reaches steady state faster than the second mode.

20 Claims, 14 Drawing Sheets

U.S. PATENT DOCUMENTS

| | | |
|---|---|---|
| 2,971,130 A | 2/1961 | Diebold |
| 3,471,784 A | 10/1969 | Arndt et al. .................. 324/126 |
| 3,538,241 A | 11/1970 | Rein ........................... 174/143 |
| 3,588,611 A | 6/1971 | Lambden et al. .............. 317/31 |
| 3,600,502 A | 8/1971 | Wagenaar et al. ........... 174/143 |
| 3,622,872 A | 11/1971 | Boaz et al. .................... 324/52 |
| 3,660,721 A | 5/1972 | Baird ........................... 317/16 |
| 3,684,955 A | 8/1972 | Adams ......................... 324/72 |
| 3,716,757 A | 2/1973 | Rodriguez ................. 317/40 R |
| 3,746,930 A | 7/1973 | Van Best et al. .............. 317/31 |
| 3,775,675 A | 11/1973 | Freeze et al. .................. 324/51 |
| 3,789,295 A | 1/1974 | Balchunas et al. ............. 324/54 |
| 3,812,337 A | 5/1974 | Crosley ................. 235/153 AC |
| 3,858,130 A | 12/1974 | Misencik ...................... 335/18 |
| 3,868,549 A | 2/1975 | Schaefer et al. ........... 317/11 E |
| 3,869,665 A | 3/1975 | Kenmochi et al. ............. 324/72 |
| 3,878,460 A | 4/1975 | Nimmersjo .................. 324/52 |
| 3,911,323 A | 10/1975 | Wilson et al. ................. 317/18 |
| 3,914,667 A | 10/1975 | Waldron ....................... 317/36 |
| 3,932,790 A | 1/1976 | Muchnick ................. 317/18 D |
| 3,939,410 A | 2/1976 | Bitsch et al. .................. 324/72 |
| 4,052,751 A | 10/1977 | Shepard ....................... 361/50 |
| 4,074,193 A | 2/1978 | Kohler ....................... 324/126 |
| 4,081,852 A | 3/1978 | Coley et al. .................. 361/45 |
| 4,087,744 A | 5/1978 | Olsen ........................... 324/51 |
| 4,130,850 A | 12/1978 | Cronin et al. ................. 361/54 |
| 4,156,846 A | 5/1979 | Harrold et al. .............. 324/158 |
| 4,166,260 A | 8/1979 | Gillette ........................ 335/20 |
| 4,169,260 A | 9/1979 | Bayer .......................... 340/562 |
| 4,214,210 A | 7/1980 | O'Shea ....................... 455/282 |
| 4,233,640 A | 11/1980 | Klein et al. ................... 361/44 |
| 4,245,187 A | 1/1981 | Wagner et al. ................ 324/54 |
| 4,251,846 A | 2/1981 | Pearson et al. ............... 361/30 |
| 4,264,856 A | 4/1981 | Frierdich et al. ............. 322/25 |
| RE30,678 E | 7/1981 | Van Zeeland et al. ........ 361/44 |
| 4,295,021 A | 10/1981 | Asinovsky et al. ..... 200/147 R |
| 4,316,187 A | 2/1982 | Spencer ...................... 340/664 |
| 4,344,100 A | 8/1982 | Broersma, Jr. et al. . 424/273 R |
| 4,354,154 A | 10/1982 | Olsen ........................... 324/51 |
| 4,356,443 A | 10/1982 | Emery ......................... 324/51 |
| 4,378,525 A | 3/1983 | Burdick ...................... 324/127 |
| 4,387,336 A | 6/1983 | Joy et al. ..................... 324/51 |
| 4,459,576 A | 7/1984 | Fox et al. ..................... 336/84 |
| 4,466,071 A | 8/1984 | Russell, Jr. ................. 364/492 |
| 4,477,855 A | 10/1984 | Nakayama et al. ........... 361/54 |
| 4,587,588 A | 5/1986 | Goldstein .................... 361/54 |
| 4,616,200 A | 10/1986 | Fixemer et al. ............... 335/35 |
| 4,631,621 A | 12/1986 | Howell ........................ 361/13 |
| 4,639,817 A | 1/1987 | Cooper et al. ................ 361/62 |
| 4,642,733 A | 2/1987 | Schact |
| 4,644,439 A | 2/1987 | Taarning ..................... 361/87 |
| 4,652,867 A | 3/1987 | Masot ........................ 340/638 |
| 4,658,322 A | 4/1987 | Rivera .......................... 361/37 |
| 4,697,218 A | 9/1987 | Nicolas ....................... 633/882 |
| 4,702,002 A | 10/1987 | Morris et al. .................. 29/837 |
| 4,707,759 A | 11/1987 | Bodkin ....................... 831/642 |
| 4,723,187 A | 2/1988 | Howell ........................ 361/13 |
| 4,771,355 A | 9/1988 | Emery et al. ................. 361/33 |
| H536 H | 10/1988 | Strickland et al. .......... 324/456 |
| H538 H | 11/1988 | Betzold ....................... 89/134 |
| 4,810,954 A | 3/1989 | Fam ........................... 324/142 |
| 4,816,958 A | 3/1989 | Belbel et al. ................. 361/93 |
| 4,833,564 A | 5/1989 | Pardue et al. ................ 361/93 |
| 4,835,648 A | 5/1989 | Yamauchi .................... 361/14 |
| 4,839,600 A | 6/1989 | Kuurstra .................... 324/127 |
| 4,845,580 A | 7/1989 | Kitchens ..................... 361/91 |
| 4,847,719 A | 7/1989 | Cook et al. ................... 361/13 |
| 4,853,818 A | 8/1989 | Emery et al. ................. 361/33 |
| 4,858,054 A | 8/1989 | Franklin ...................... 361/57 |
| 4,866,560 A | 9/1989 | Allina ........................ 361/104 |
| 4,878,144 A | 10/1989 | Nebon .......................... 361/96 |
| 4,882,682 A | 11/1989 | Takasuka et al. ........... 364/507 |
| 4,893,102 A | 1/1990 | Bauer ......................... 335/132 |
| 4,901,183 A | 2/1990 | Lee .............................. 361/56 |
| 4,922,368 A | 5/1990 | Johns .......................... 361/62 |
| 4,931,894 A | 6/1990 | Legatti ........................ 361/45 |
| 4,939,495 A | 7/1990 | Peterson et al. .............. 337/79 |
| 4,949,214 A | 8/1990 | Spencer ....................... 361/95 |
| 4,969,063 A | 11/1990 | Scott et al. ................... 361/93 |
| 5,010,438 A | 4/1991 | Brady .......................... 361/56 |
| 5,047,724 A | 9/1991 | Boksiner et al. ............ 324/520 |
| 5,051,731 A | 9/1991 | Guim et al. ................ 340/638 |
| 5,121,282 A | 6/1992 | White .......................... 361/42 |
| 5,166,861 A | 11/1992 | Krom ......................... 361/379 |
| 5,168,261 A | 12/1992 | Weeks |
| 5,179,491 A | 1/1993 | Runyan ....................... 361/45 |
| 5,185,684 A | 2/1993 | Beihoff et al. ............... 361/45 |
| 5,185,685 A | 2/1993 | Tennies et al. .............. 361/45 |
| 5,185,686 A | 2/1993 | Hansen et al. ............... 361/45 |
| 5,185,687 A | 2/1993 | Beihoff et al. ............... 361/45 |
| 5,206,596 A | 4/1993 | Beihoff et al. .............. 324/536 |
| 5,208,542 A | 5/1993 | Tennies et al. ............. 324/544 |
| 5,223,795 A | 6/1993 | Blades ....................... 324/536 |
| 5,224,006 A | 6/1993 | MacKenzie et al. .......... 361/45 |
| 5,257,157 A | 10/1993 | Epstein ...................... 361/111 |
| 5,280,404 A | 1/1994 | Ragsdale ................... 361/113 |
| 5,286,933 A | 2/1994 | Pham |
| 5,307,230 A | 4/1994 | MacKenzie ................. 361/96 |
| 5,321,574 A | 6/1994 | Patrict et al. ................. 361/99 |
| 5,334,939 A | 8/1994 | Yarbrough |
| 5,353,014 A | 10/1994 | Carroll et al. .............. 340/638 |
| 5,359,293 A | 10/1994 | Boksiner et al. ............ 324/544 |
| 5,363,269 A | 11/1994 | McDonald |
| 5,373,241 A | 12/1994 | Ham, Jr. et al. ............ 324/536 |
| 5,383,084 A | 1/1995 | Gershen et al. ............. 361/113 |
| 5,388,021 A | 2/1995 | Stahl ............................ 361/56 |
| 5,396,179 A | 3/1995 | Domenichini et al. ...... 324/546 |
| 5,412,526 A | 5/1995 | Kapp et al. ................... 361/56 |
| 5,414,590 A | 5/1995 | Tajali ......................... 361/669 |
| 5,420,740 A | 5/1995 | MacKenzie et al. .......... 361/45 |
| 5,424,894 A | 6/1995 | Briscall et al. ............... 361/45 |
| 5,434,509 A | 7/1995 | Blades ....................... 324/536 |
| 5,444,424 A | 8/1995 | Wong et al. ................ 335/172 |
| 5,446,431 A | 8/1995 | Leach et al. ................. 335/18 |
| 5,448,443 A | 9/1995 | Muselleman ............... 361/111 |
| 5,452,222 A | 9/1995 | Gray et al. .................. 364/481 |
| 5,452,223 A | 9/1995 | Zuercher et al. ............ 364/483 |
| 5,459,630 A | 10/1995 | MacKenzie et al. .......... 361/45 |
| 5,473,494 A | 12/1995 | Kurosawa et al. .............. 361/3 |
| 5,477,150 A | 12/1995 | Ham, Jr. et al. ............ 324/536 |
| 5,481,235 A | 1/1996 | Heise et al. .................. 335/18 |
| 5,483,211 A | 1/1996 | Carrodus et al. ............. 335/18 |
| 5,485,093 A | 1/1996 | Russell et al. .............. 324/522 |
| 5,493,278 A | 2/1996 | MacKenzie et al. ........ 340/638 |
| 5,499,189 A | 3/1996 | Seitz ........................... 364/480 |
| 5,506,789 A | 4/1996 | Russell et al. .............. 364/492 |
| 5,510,946 A | 4/1996 | Franklin |
| 5,512,832 A | 4/1996 | Russell et al. .............. 324/522 |
| 5,519,561 A | 5/1996 | Mrenna et al. ............. 361/105 |
| 5,531,617 A | 7/1996 | Marks ......................... 439/723 |
| 5,537,327 A | 7/1996 | Snow et al. ................. 364/483 |
| 5,544,003 A | 8/1996 | Vaughan ..................... 361/625 |
| 5,546,266 A | 8/1996 | Mackenzie et al. ........... 361/93 |
| 5,561,605 A | 10/1996 | Zuercher et al. ............ 364/483 |
| 5,568,371 A | 10/1996 | Pitel et al. ................... 363/39 |
| 5,578,931 A | 11/1996 | Russell et al. .............. 324/536 |
| 5,590,010 A | 12/1996 | Ceola et al. .................. 361/93 |
| 5,590,012 A | 12/1996 | Dollar ........................ 361/113 |
| 5,602,709 A | 2/1997 | Al-Dabbagh ................. 361/85 |
| 5,608,328 A | 3/1997 | Sanderson ................. 324/529 |
| 5,617,019 A | 4/1997 | Etter ....................... 324/117 R |

| | | | | | | | | |
|---|---|---|---|---|---|---|---|---|
| 5,629,658 | A | | 5/1997 | Chen ............................ 335/201 | 6,229,680 | B1 | 5/2001 | Shea ............................ 361/42 |
| 5,638,244 | A | | 6/1997 | Mekanik et al. ............... 361/62 | 6,232,857 | B1 | 5/2001 | Mason, Jr. et al. ........... 335/18 |
| 5,646,502 | A | | 7/1997 | Johnson .......................... 320/5 | | | | |
| 5,657,244 | A | | 8/1997 | Seitz .......................... 364/492 | | | | |
| 5,659,453 | A | | 8/1997 | Russell et al. ................. 361/93 | | | | |
| 5,661,645 | A | | 8/1997 | Hochstein ..................... 363/89 | | | | |
| 5,682,101 | A | | 10/1997 | Brooks et al. ............... 324/536 | | | | |
| 5,691,869 | A | | 11/1997 | Engel et al. .................... 361/42 | | | | |
| 5,701,110 | A | | 12/1997 | Scheel et al. ................ 335/132 | | | | |
| 5,706,154 | A | | 1/1998 | Seymour ...................... 361/42 | | | | |
| 5,710,513 | A | | 1/1998 | March ......................... 324/424 | | | | |
| 5,726,577 | A | | 3/1998 | Engel et al. ................. 324/536 | | | | |
| 5,729,145 | A | | 3/1998 | Blades ........................ 324/536 | | | | |
| 5,764,125 | A | | 6/1998 | May ............................. 336/92 | | | | |
| 5,805,397 | A | | 9/1998 | MacKenzie ................... 361/42 | | | | |
| 5,805,398 | A | | 9/1998 | Rae .............................. 361/42 | | | | |
| 5,812,352 | A | | 9/1998 | Rokita et al. ................. 361/58 | | | | |
| 5,815,352 | A | | 9/1998 | Mackenzie ................... 361/42 | | | | |
| 5,818,237 | A | | 10/1998 | Zuercher et al. ............. 324/536 | | | | |
| 5,818,671 | A | | 10/1998 | Seymour et al. .............. 361/42 | | | | |
| 5,825,598 | A | | 10/1998 | Dickens et al. ................ 361/42 | | | | |
| 5,834,940 | A | | 11/1998 | Brooks et al. ............... 324/424 | | | | |
| 5,835,319 | A | | 11/1998 | Welles, II et al. ............... 361/5 | | | | |
| 5,835,321 | A | | 11/1998 | Elms et al. .................... 361/45 | | | | |
| 5,839,092 | A | | 11/1998 | Erger et al. .................... 702/58 | | | | |
| 5,847,913 | A | | 12/1998 | Turner et al. .................. 361/93 | | | | |
| 5,886,861 | A | | 3/1999 | Parry ........................... 361/42 | | | | |
| 5,889,643 | A | | 3/1999 | Elms ............................ 361/42 | | | | |
| 5,896,262 | A | | 4/1999 | Rae et al. ...................... 361/94 | | | | |
| 5,905,619 | A | | 5/1999 | Jha ............................... 361/93 | | | | |
| 5,933,305 | A | | 8/1999 | Schmalz et al. ............... 361/42 | | | | |
| 5,933,308 | A | | 8/1999 | Garson ......................... 361/62 | | | | |
| 5,963,405 | A | * | 10/1999 | Engel et al. .................... 361/42 | | | | |
| 5,969,920 | A | | 10/1999 | Mackenzie ................... 361/42 | | | | |
| 5,982,593 | A | | 11/1999 | Kimblin et al. ................ 361/42 | | | | |
| 5,986,860 | A | | 11/1999 | Scott ............................ 361/42 | | | | |
| 6,002,561 | A | | 12/1999 | Dougherty ................... 361/42 | | | | |
| 6,014,297 | A | | 1/2000 | Clarey et al. ................. 361/42 | | | | |
| 6,031,699 | A | | 2/2000 | Dollar, II et al. ............. 361/42 | | | | |
| 6,040,967 | A | | 3/2000 | DiSalvo ........................ 361/42 | | | | |
| 6,052,046 | A | | 4/2000 | Ennis et al. ................. 335/202 | | | | |
| 6,084,756 | A | | 7/2000 | Doring et al. ................. 361/45 | | | | |
| 6,111,733 | A | * | 8/2000 | Neiger et al. .................. 361/42 | | | | |
| 6,191,589 | B1 | | 2/2001 | Clunn ......................... 324/424 | | | | |
| 6,198,611 | B1 | | 3/2001 | Macbeth ....................... 361/42 | | | | |
| 6,215,378 | B1 | | 4/2001 | Gibson et al. ................ 338/18 | | | | |
| 6,229,679 | B1 | | 5/2001 | Macbeth ....................... 361/42 | | | | |

FOREIGN PATENT DOCUMENTS

| | | | |
|---|---|---|---|
| CA | 2277589 | 6/1999 | |
| CA | 2305910 | 5/2000 | |
| CA | 2307812 | 10/2000 | |
| EP | 0094871 A1 | 5/1983 | |
| EP | 0502393 A2 | 2/1992 | |
| EP | 0615327 A2 | 9/1994 | ............ H02H/1/00 |
| EP | 0649207 A1 | 4/1995 | |
| EP | 0748021 A1 | 12/1996 | |
| EP | 0762591 A2 | 3/1997 | |
| EP | 0802602 A2 | 10/1997 | |
| EP | 0813281 A2 | 12/1997 | |
| EP | 0911937 A2 | 9/1998 | |
| EP | 0945949 A2 | 3/1999 | |
| EP | 0954003 A2 | 4/1999 | |
| EP | 0974995 A2 | 7/1999 | |
| EP | 0981193 A2 | 7/1999 | |
| EP | 1005129 | 5/2000 | |
| GB | 2177561 A | 6/1985 | |
| GB | 2215149 A | 9/1989 | |
| GB | 2285886 A | 7/1995 | |
| JP | 06308191 | 11/1994 | ............ G01R/31/12 |
| WO | WO92/08143 | 5/1992 | |
| WO | WO 97/30501 | 8/1997 | |
| WO | WO00/11696 | 3/2000 | |
| WO | WO00/36623 | 6/2000 | |
| WO | WO00/39771 | 7/2000 | |
| WO | WO01/01536 | 1/2001 | |

OTHER PUBLICATIONS

RV4145 Low Power Ground Fault Interrupter, Preliminary Product Specifications Of Integrated Circuits, Raytheon Company Semiconductor Division, pp. 1–8 (no date).

Joubert, Jean–Francois, Feasibility Of Main Service Ground–Fault Protection On The Electrical Service To Dwelling Units, Consultants Electro–Protection Ins., pp. 1–77 (Oct. 26, 1990).

Russell, B.D., Detection Of Arcing Faults On Distribution Feeders, Texas A & M Research Foundation, Final Report, pp. 1–B18 (Dec. 1982).

* cited by examiner slow_rise = peak1-max_di/dt1

ELECTRICAL FAULT DETECTION CIRCUIT WITH DUAL-MODE POWER SUPPLY

CROSS REFERENCE TO RELATED APPLICATIONS

This application is a continuation-in-part of co-pending application Ser. No. 09/129,685, filed Aug. 5, 1998, which is a continuation-in-part of co-pending application Ser. No. 09/026,193, filed Feb. 19, 1998 which is a continuation in part of Ser. No. 08/814,754, filed Mar. 7, 1997 is a divisional of Ser. No. 08/600,512, filed Feb. 13, 1996 now U.S. Pat. No. 5,682,101. Which is a continuation in part of Ser. No. 08/402,678, filed Mar. 13, 1995 now abandoned. Which is a continuation in part of Ser. No. 08/402,600; filed Mar. 13, 1995 now abandoned. Which is a continuation in part of Ser. No. 08/402,575; filed Mar. 13, 1995 now abandoned. Which is a continuation in part of Ser. No. 08/403,084; filed Mar. 13, 1995 now abandoned. Which is a continuation in part of Ser. No. 08/403,033; filed Mar. 13, 1995 now abandoned.

Each of the above applications has the same assignee as the present application, and is incorporated herein by reference.

FIELD OF THE INVENTION

The present invention relates to the protection of electrical circuits and, more particularly, to the detection of arcing faults in an arcing fault protection assembly which includes a dual-mode power supply to power up the assembly quickly using an inefficient power mode, and then switch to a more efficient power mode after the second power mode reaches steady state.

BACKGROUND OF THE INVENTION

The electrical systems in residential, commercial and industrial applications usually include a panelboard for receiving electrical power from a utility source. The power is then routed through protection devices to designated branch circuits supplying one or more loads. These protection devices are typically circuit interrupters, such as circuit breakers and fuses, which are designed to interrupt the electrical current if the limits of the conductors supplying the loads are surpassed. The power connection to the electrical systems is reestablished either by resetting the circuit breakers or by replacing the fuses. If the cause of the overload to the system is not removed before the circuit breaker is reset or the fuse is replaced, the circuit interrupters will again interrupt the electrical current to the system. The circuit interrupters, however, will not detect the power overload until the power supplied to the interrupter reaches steady state. Adjusting the power to increase the time for the circuit to reach steady state will cause the interrupter to overheat.

Typically, ground fault detectors interrupt an electric circuit due to a disconnect or trip condition, such as a current overload or ground fault. The current overload condition results when a current exceeds the continuous rating of the breaker for a time interval determined by the trip current. A ground fault trip condition is created by an imbalance of currents flowing between a line conductor and a neutral conductor which could be caused by a leakage current or an arcing fault to ground.

Arcing faults are commonly defined as current through ionized gas between two ends of a broken conductor or at a faulty contact or connector, between two conductors supplying a load, or between a conductor and ground. Arcing faults, however, may not cause a conventional circuit breaker to trip. Arcing fault current levels may be reduced by branch or load impedance to a level below the trip curve settings of the circuit breaker. In addition, an arcing fault which does not contact a grounded conductor, object or person will not trip a ground fault protector.

There are many conditions that may cause an arcing fault, for example, corroded, worn or aged wiring, connectors, contacts or insulation, loose connections, wiring damaged by nails or staples through the insulation, and electrical stress caused by repeated overloading, lightning strikes, etc. These faults may damage the conductor insulation and cause the conductor to reach an unacceptable temperature.

SUMMARY OF THE INVENTION

It is an object of the present invention to provide an arc fault and ground fault detection system that includes a dual-mode power supply to quickly power up the system and allow it to detect faults quickly after power is supplied to the system, i.e., after the system is reset.

Other and further objects and advantages of the invention will be apparent to those skilled in the art from the present specification taken with the accompanying drawings and appended claims.

In accordance with one aspect of the invention, there is provided an arcing fault and ground fault detection system comprising at least one sensor responsive to a current flowing in an electrical circuit for developing a corresponding sensor signal; a fault detector responsive to the sensor signal for detecting arcing faults and ground faults and producing corresponding output signals; a dual-mode power supply connected to the electrical circuit and the detector for supplying a predetermined output voltage to the detector, the power supply having first and second modes with the first mode supplying the predetermined output voltage more quickly than, but drawing more supply current than, the second mode; and switching means for switching the power supply from the first mode to the second mode.

The above summary of the present invention is not intended to represent each embodiment or every aspect of the present invention. This is the purpose of the drawings and detailed description which follow.

DESCRIPTION OF ILLUSTRATIVE EMBODIMENTS

Figure 1:
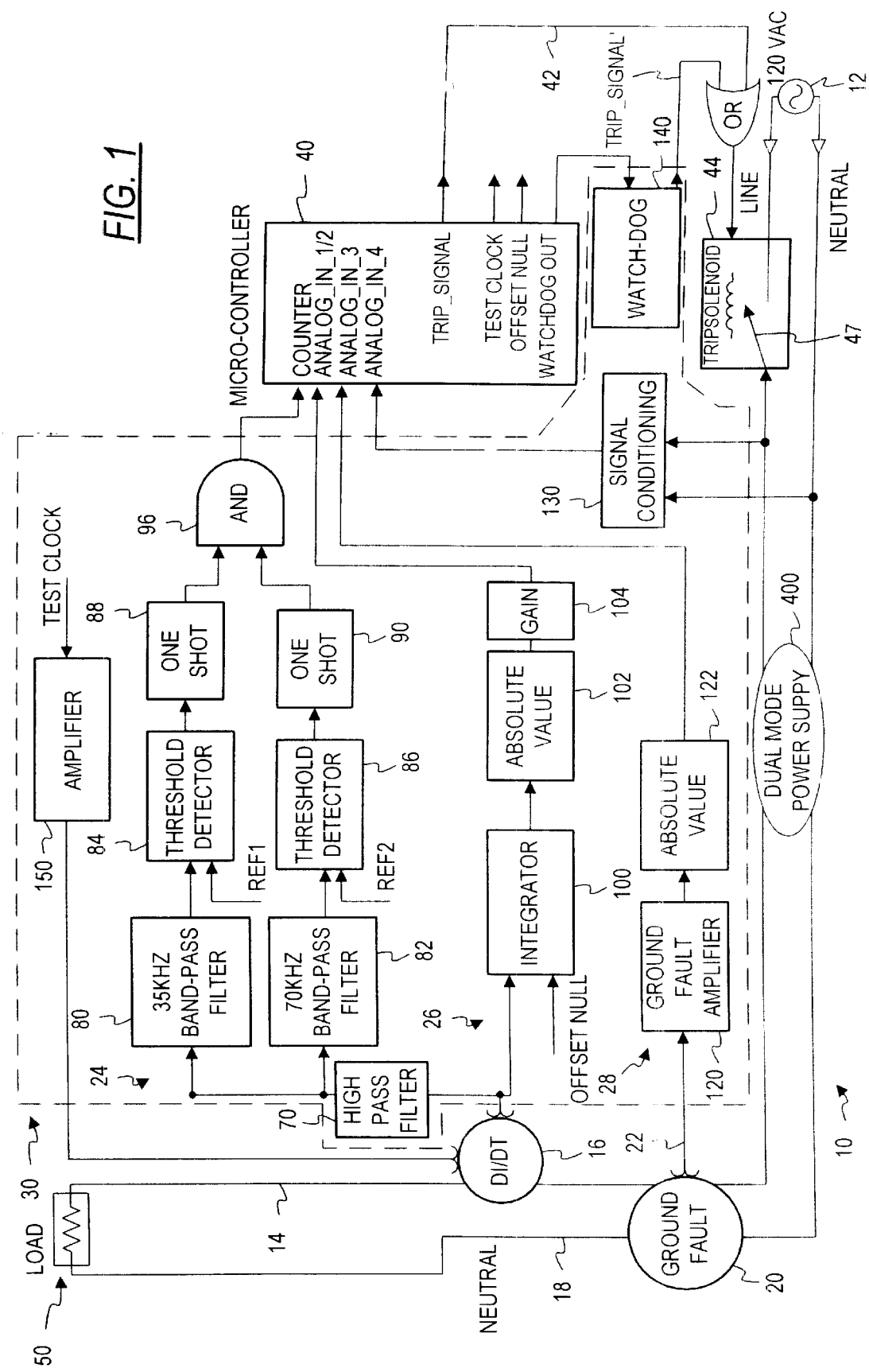
FIG. 1 is a functional block diagram of an arc fault detection system embodying the invention.

While the invention is susceptible to various modifications and alternative forms, a specific embodiment thereof has been shown by way of example in the drawings and will be described in detail. It should be understood, however, that it is not intended to limit the invention to the particular form described but, on the contrary, the intention is to cover all modifications, equivalents and alternatives falling within the spirit and scope of the invention as defined by the appended claims.

Referring now to the drawings in initially to FIG. 1, there is shown in block form an electrical fault detector system in accordance with the invention, and designated generally by the reference numeral 10. In the illustrative example, the fault detection system 10 is associated with an electrical circuit such as a 120 VAC circuit 12 which is to be monitored for faults. Of course, the invention is not limited to use with a 120 VAC circuit.

At least one sensor 16 is provided in association with the 120 VAC circuit 12 for producing a signal representative of a signal condition, such as power, voltage or current, in the 120 VAC circuit 12. In the illustrated embodiment, one such sensor 16 comprises a current rate-of-change sensor (di/dt). A line conductor 14 of the 120 VAC circuit 12 passes through the rate-of-change current sensor (di/dt) 16 which produces a signal representative of the rate of change of current flow in the line conductor 14. In the illustrative embodiment, both the line conductor 14 and a neutral conductor 18 of the 120 VAC circuit 12 pass through a ground fault sensor 20 which is responsive to the current flowing through the line and neutral sides of the circuit 12 for producing an output signal on conductor 22. If the current flow through the line and neutral conductors is different, this is indicative of a ground fault.

Preferably, the di/dt sensor 16 and the ground fault sensor 20 each comprise a toroidal coil having an annular core which surrounds the relevant conductors, with a toroidal sensing coil wound helically on the core. In the sensor 16, the core may be made of magnetic material such as ferrite, iron or molded permeable powder, such that the sensor is capable of responding to rapid changes in flux. An air gap may be cut into the core in certain instances to reduce the permeability, and the core material is such that it does not saturate during the relatively high current produced by some forms of arcing, so that arc detection is still possible. The particular requirements for the construction of the toroidal coil and core for the ground fault sensor 20 may differ somewhat for those for the di/dt sensor 16, such ground fault sensors or transformers being generally known in the art.

During operation, the current in the monitored circuit 12 generates a field which induces a voltage in the di/dt sensor 16. The voltage output of the sensor 16 is primarily proportional to the instantaneous rate of change of current. The calibration of the sensor 16 may be chosen to provide a signal in a range and frequency spectrum in which arcs can be most easily distinguished from loads. This range and spectrum may vary with the application.

The di/dt sensor 16 provides an input to an arcing fault detector circuit 24 which is preferably a broadband noise detector circuit and a current fault detector circuit 26 which is preferably a current measuring circuit. The ground fault sensor 20 provides an input via conductor 22 to a ground fault detector circuit 28. In the illustrated embodiment, all of the components of the arcing fault circuit detector circuit 24, the current fault detector circuit 26 and the ground fault detector circuit 28, as well as some other circuit components to be described later, are provided on an application specific integrated circuit (ASIC) 30. Suitable output signals from the ASIC 30 are fed to a microcontroller 40 which, based on analysis and further processing of the signals provided by the ASIC 30, makes a decision as to whether to send a trip signal to an output 42 for activating a trip circuit 44 which will in effect switch the line side conductor 14 of the 120 VAC circuit 12 to an open circuit condition as indicated diagrammatically in FIG. 1, or whether to allow the line side 14 of the circuit 12 to remain connected to a load 50.

A dual-mode power supply 400 is connected to the power supply line between the trip circuit 44 and the ground-fault sensor 20 to allow the system 10 to power-up quickly and detect faults shortly after power is supplied to the system 10, e.g., after the fault detection system 10 is reset. The dual-mode power supply 400 continues to receive power from circuit 12 without dissipating excessive heat while power is being supplied to the system 10.

Figure 2:
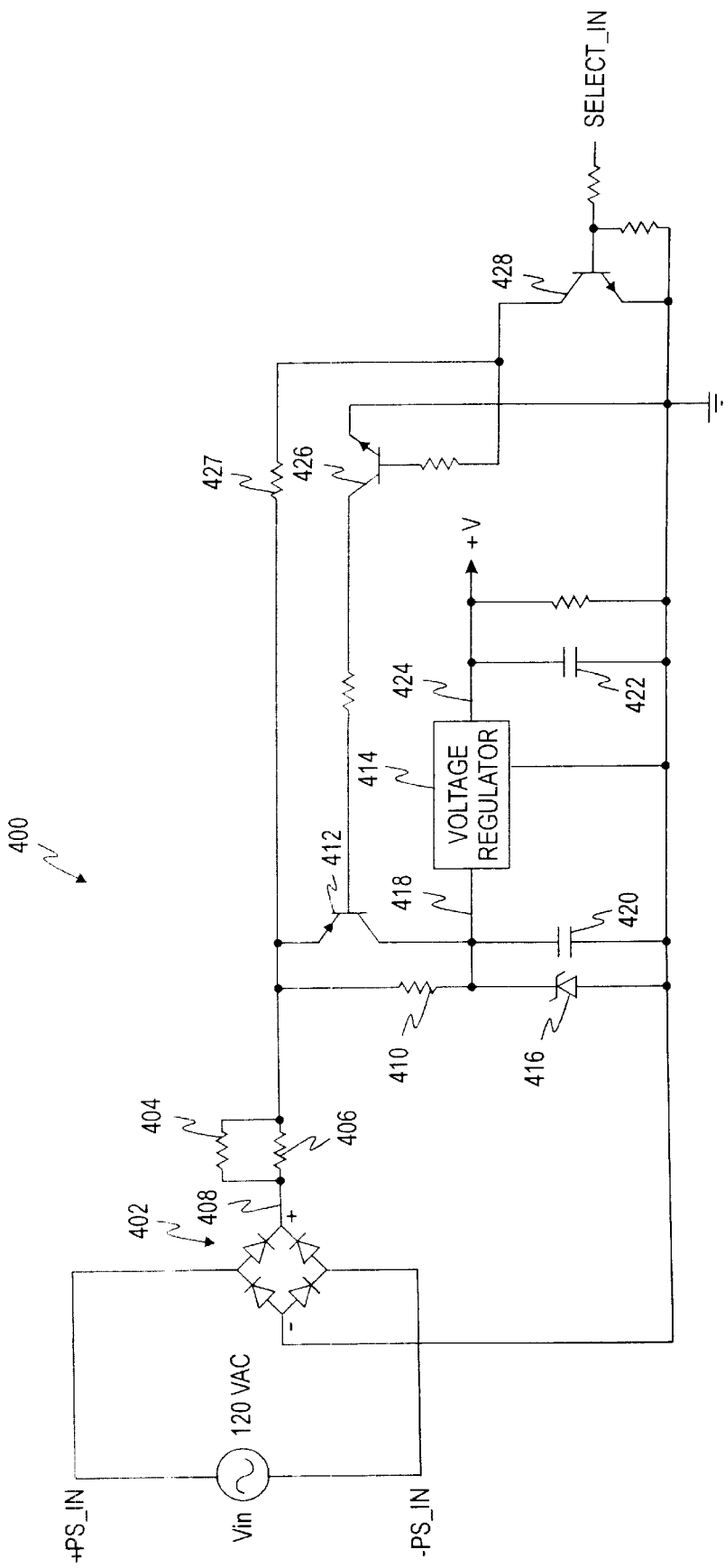
FIG. 2 is a schematic diagram of a dual-mode power supply in accordance with the present invention.
Figure 3:
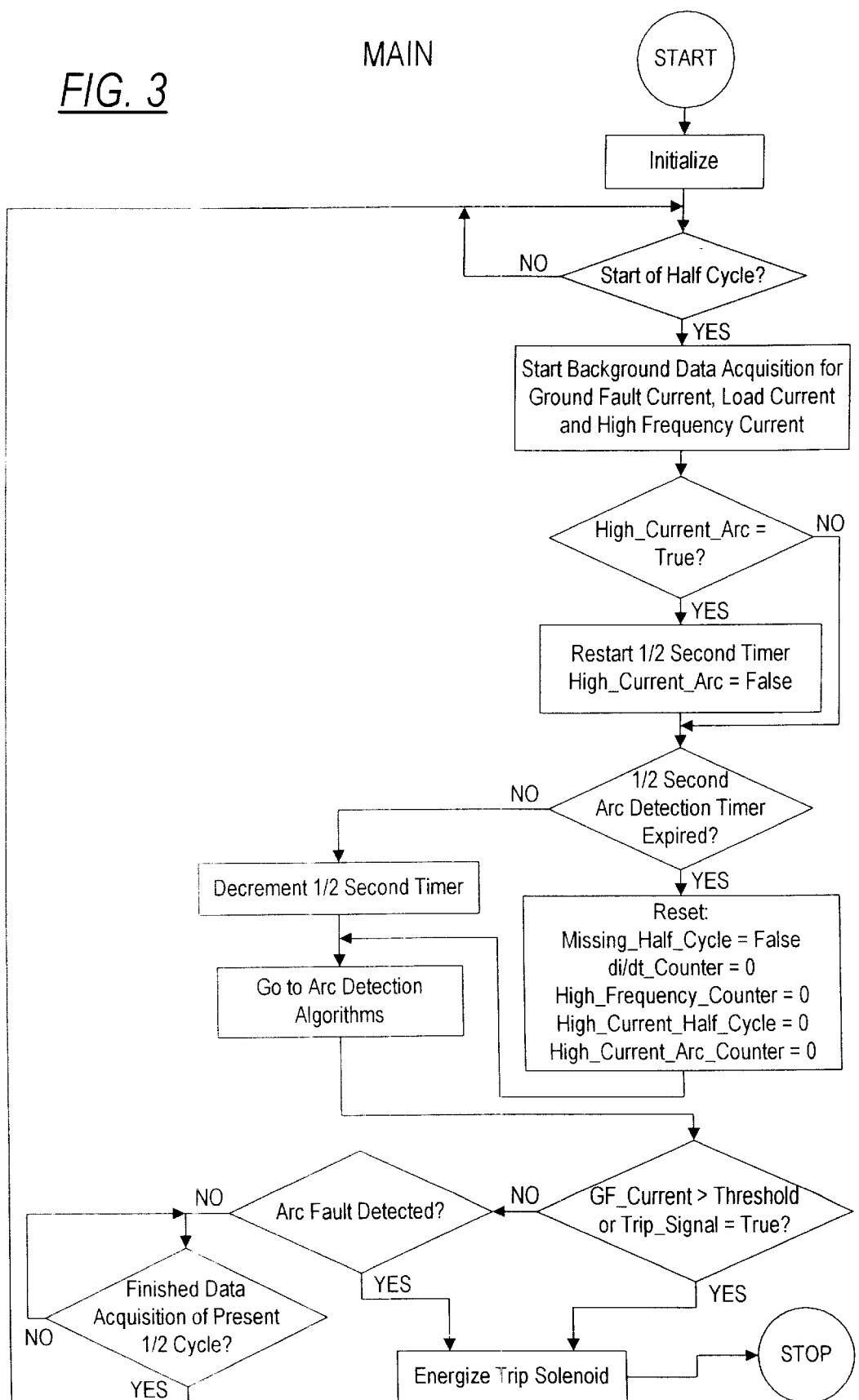
FIGS. 3–8 are flow charts illustrating the operation of the invention.
Figure 4:
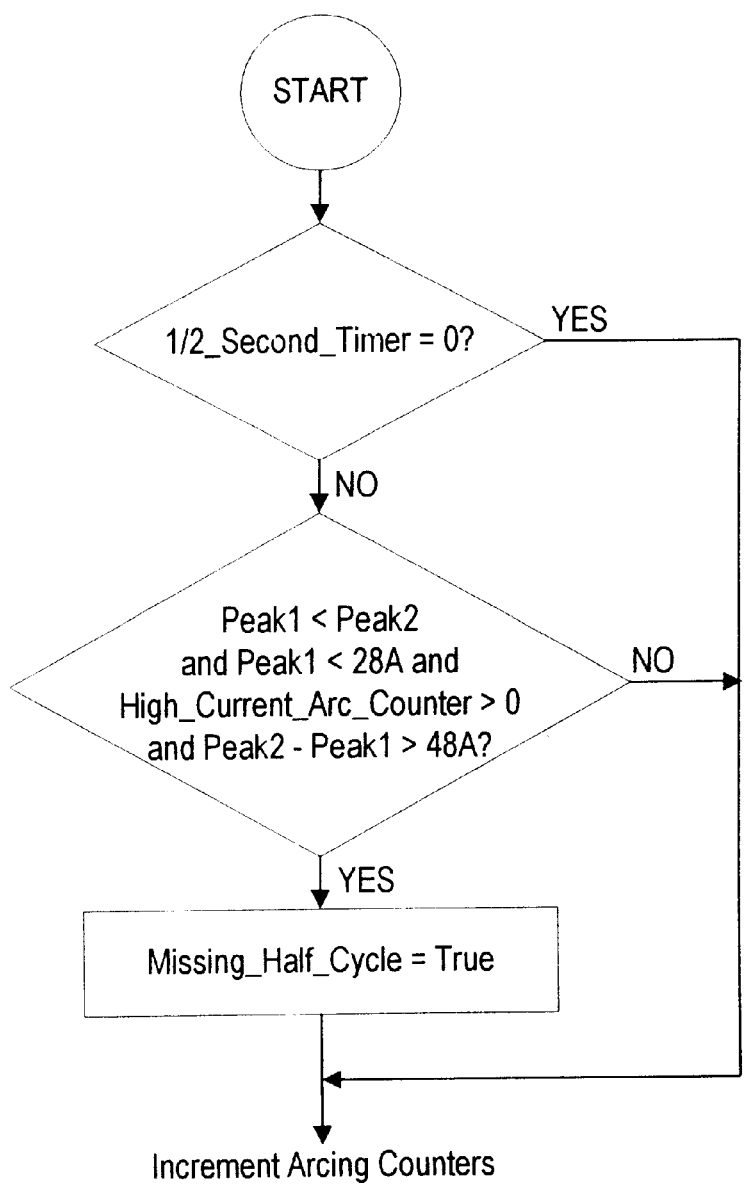
Figure 5:
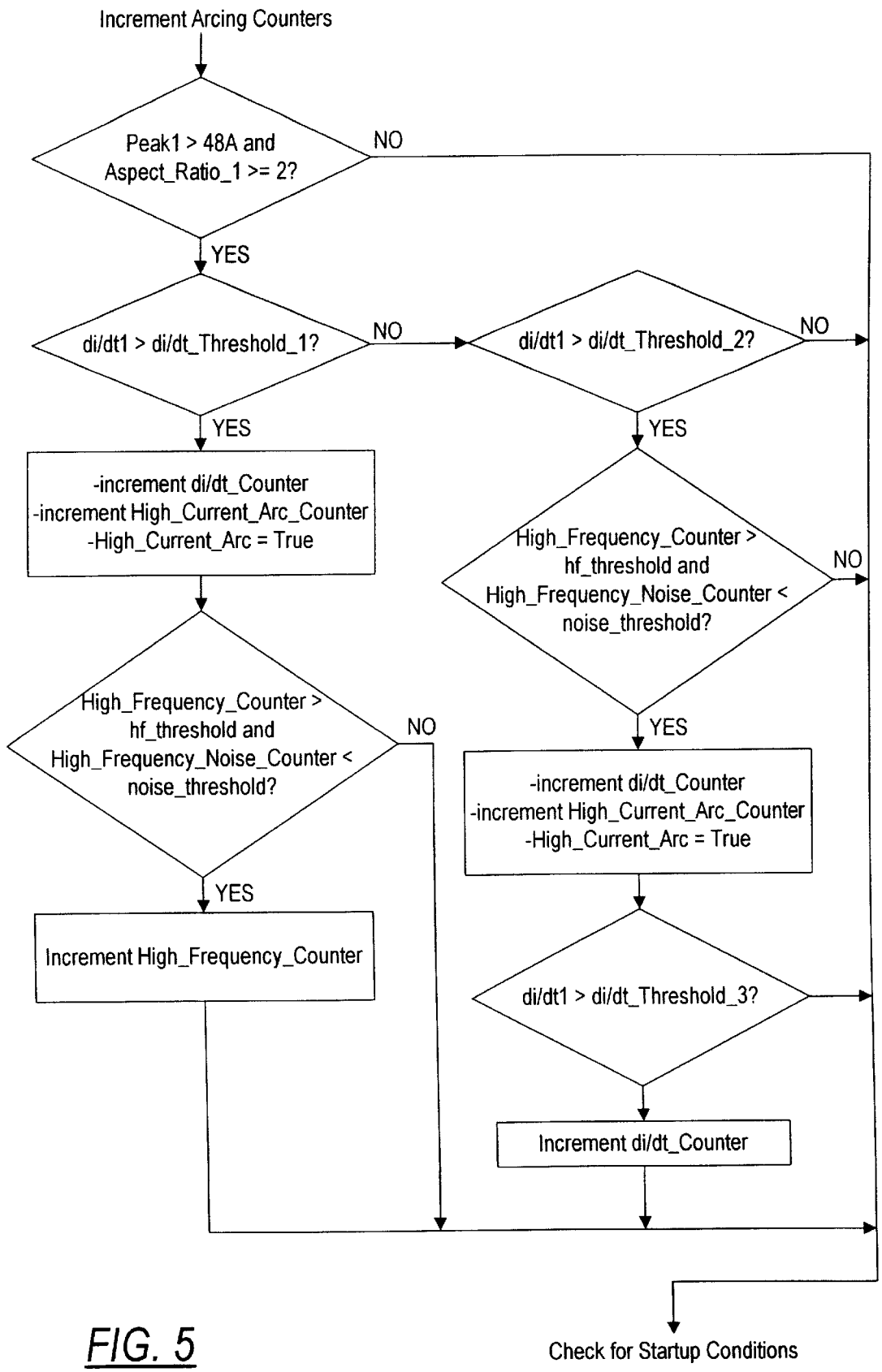
Figure 6:
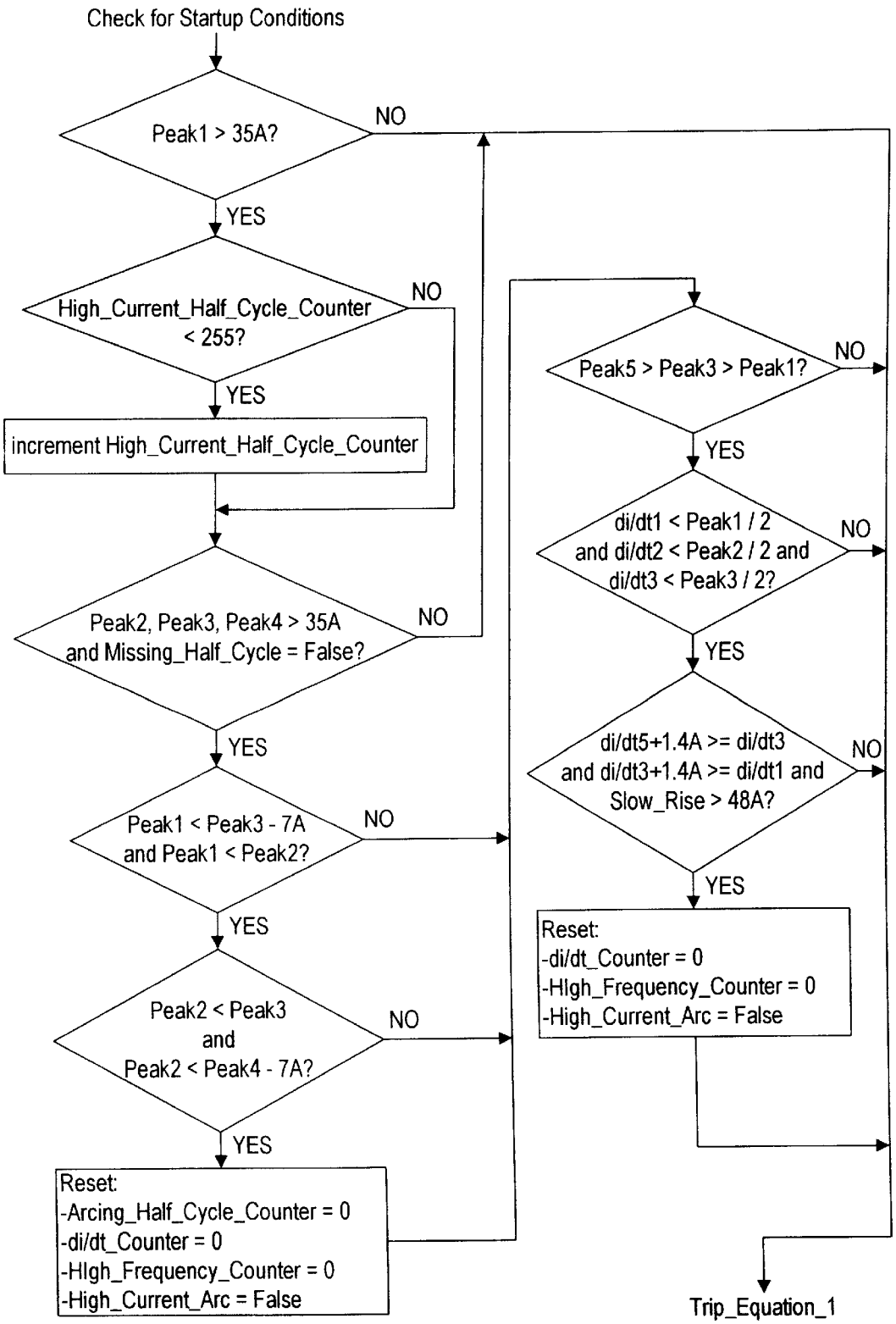
Figure 7:
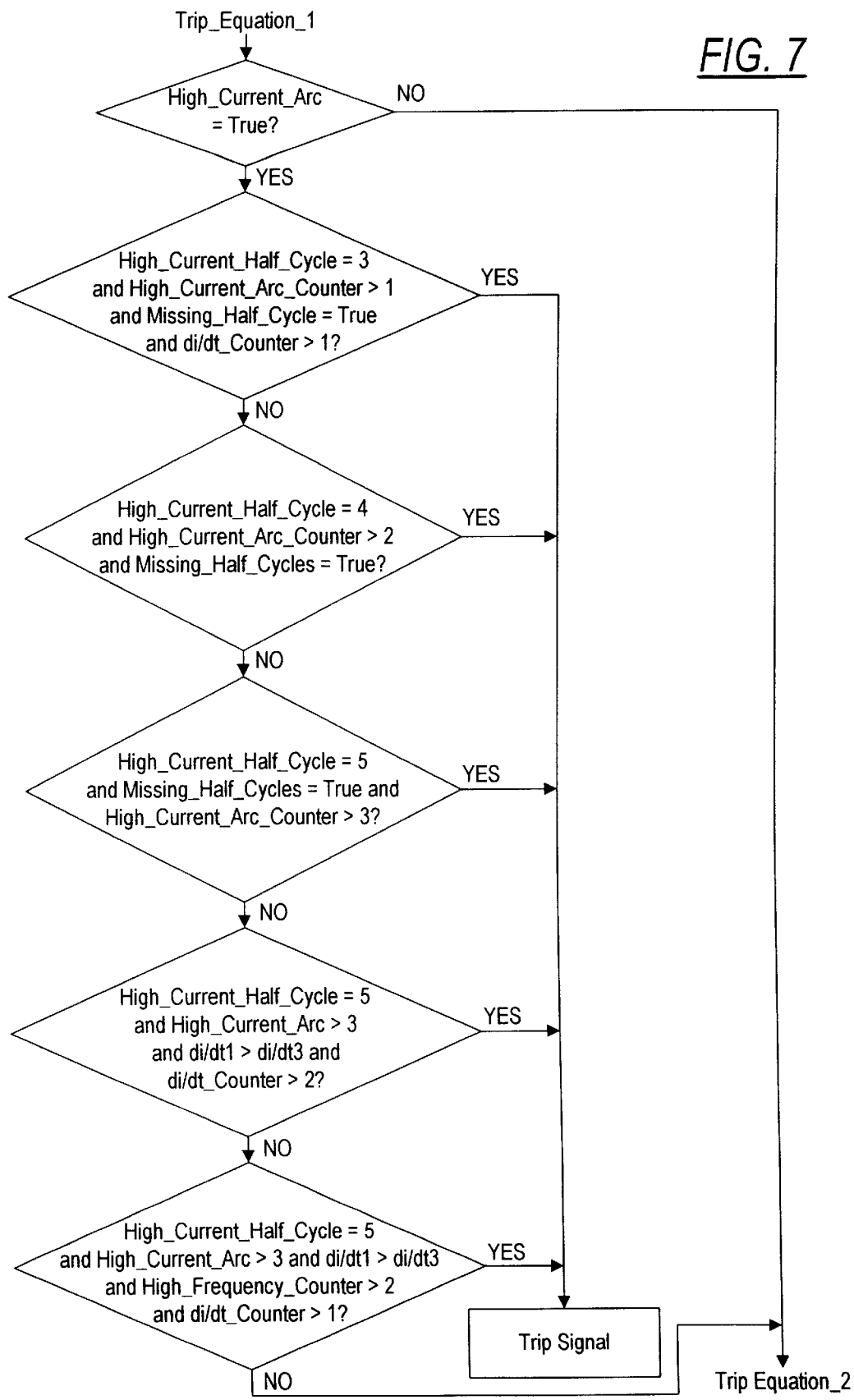
Figure 8:
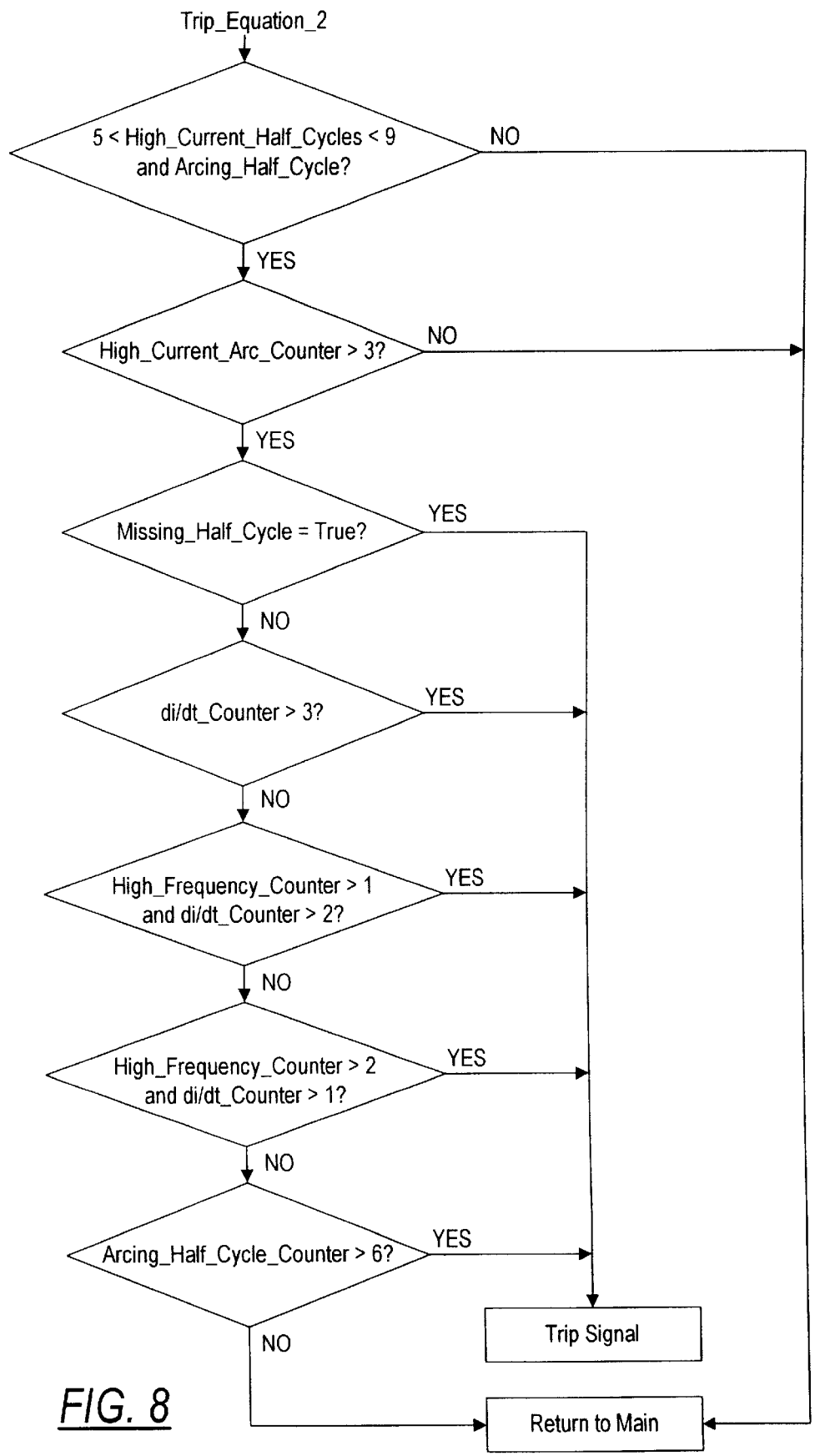

An example of a dual-mode power supply 400 used to supply power to the fault detector system 10 is shown in FIG. 2. The present invention, however, is not limited to the particular dual-mode power supply shown. In a first, high-power mode, the dual-mode power supply 400 powers up very quickly and is inherently inefficient, consuming power at a relatively high rate. The second mode of the dual-mode power supply 400 is much more efficient, powering up more slowly than the first mode. Initially, the dual-mode power supply 400 is set to the first mode. After the second mode reaches steady state, the dual-mode power supply 400 switches to the second mode and turns off the first mode.

At the input to the dual-mode power supply 400, a diode bridge rectifies the alternating current supplied from the power source 12. Parallel resistors 404, 406 connected to the positive pin 408 of the bridge 402 drop the supply voltage and limit the supply current. The supply current passes through a resistor 410 and a PNP transistor 412 (when this transistor is turned on) to charge a capacitor 420. The charge on the capacitor determines the voltage on the input 418 to a voltage regulator 414, and the output of this regulator 414 on conductor 424 is the output voltage+V (typically+5 VDC) of the power supply. The input voltage on line 418 is clamped by a zener diode 416 to prevent over-voltage. The input capacitor 420 also filters rippling from the voltage at input 418, and an output capacitor 422 filters rippling from the voltage at output 424

When the power supply circuit begins to receive supply current, e.g., following a trip and reset of the breaker, the transistor 412 is turned on because its base is connected to ground through an NPN transistor 426. The transistor 412 is initially on because its base is held low by a second NPN transistor 426, which is also initially on because its base is held high by resistor 427. When the control signal SELECT_IN goes high, the transistor 428 is turned on, which in turn turns off the transistor 426 and thus the transistor 412 turns off Thus the control signal SELECT_IN determines when the power supply circuit 400 is switched from the first mode to the second mode. This control signal may be programmed as a function of time, or may be produced in response to a predetermined +V output level.

As long as the transistor 412 is on, the capacitor 420 is charged at a fast rate because the current-limiting resistor 410 is bypassed. This quickly brings the output voltage +V up to the level required to power the ASIC 30 and the microcontroller 40 so that any existing faults can be quickly detected. This is the first mode of operation of the dual-mode power supply circuit 400. Then within about 2 to 3 milliseconds, the SELECT_IN control voltage rises to turn off transistors 426 and 412, thus reducing the current flow to the capacitor 420 and the attendant power consumption. This is the second mode of operation.

Referring still to FIG. 1, additional components of the ASIC 30 will next be described.

The broadband noise detector 24 comprises a high-pass filter 70 and first and second band-pass filter circuits 80, 82 which receive the rate-of-change-of-current signal from the di/dt sensor 16. The band passes of these circuits 80 and 82 are selected at frequency bands which are representative of a frequency spectrum typical of arcing faults so as to substantially (statistically) eliminate signals at frequencies which may occur on the line which do not represent, that is are not due to, an arcing fault. The frequency bands of the filters 80 and 82 are chosen across the spectrum from 10 kHz to 100 kHz. In one example, the center frequencies are 33 kHz and 58 kHz. In this example, the output signal from the sensor 16 is detected (rectified) and filtered with the high-pass filter 70 with a corner frequency of 5 kHz.

In the illustrative embodiment, the center frequencies are 35 kHz and 70 kHz, respectively. Each of the band-pass filter circuits 80 and 82 feeds a filtered signal, comprising those components of an input signal from the di/dt sensor which fall within their respective band-pass frequency bands, to respective threshold detector circuits 84 and 86.

The threshold detectors 84 and 86 are responsive to those components of the frequency signals passed by the band-pass filters 80 and 82 which are above a predetermined threshold amplitude for producing a corresponding frequency amplitude output to signal conditioning circuits 88 and 90. These circuits 88 and 90 produce a conditioned output signal in a form suitable for input into the microcontroller 40. In the illustrative embodiment, these latter signal-conditioning circuits 88 and 90 comprise ten-microsecond one-shot circuits for producing a unit pulse signal. The output pulses generated by the one-shots 88 and 90 are ANDed at an AND circuit 96 whose output is fed to a "counter" input of the microcontroller 40, as indicated in FIG. 1. In the illustrative embodiment, a one-volt threshold is utilized by both of the threshold circuits 84 and 86.

The use of the terms "band-pass filter," "threshold detector," "AND gate," and "integrator" does not limit the invention to hardware implementations of these devices. Software implementations of these functions can be utilized, provided the di/dt signal (from sensor 16) is first amplified and converted to digital values.

Referring still to FIG. 1, the current fault sensor or current measuring portion 26 of the ASIC 30 also receives the output signal of the di/dt sensor 16. An integrator circuit 100 develops a signal representative of current magnitude in response to the output of the di/dt sensor 16. This signal is fed to a further signal conditioning circuit portion 102 which includes an absolute value circuit as shown in FIG. 1 and a gain circuit 104 for producing a conditioned current output signal in a form suitable for input to the controller 40.

The absolute value circuit 102 takes signals that are both negative- and positive-going and inverts any negative-going signals to positive signals while passing through positive-going signals unchanged.

The output of the absolute value circuit 102 is fed into the gain circuit 104 which in one embodiment includes a low current gain stage and a high current gain stage. Briefly, the low current gain stage applies a relatively greater amount of gain to relatively low currents so as to increase the resolution of the current signal for relatively low current levels. On the other hand, the high current gain stage applies a relatively lower gain to relatively higher current levels in order to maintain a full range of current signal levels through the circuit. The outputs of the respective low current and high current gain stages are fed to the microcontroller 40.

The signals supplied to the microcontroller 40 are sampled by an analog-to-digital A/D converter that may be a part of the mnicrocontroller. In one embodiment, the output of the AID converter is a series of 8 bit (minimum) values representing the current at a rate of 64 samples per cycle. As the frequency drifts from nominal, the time between voltage zero crossings, detected by a zero crossing detection circuit, is measured using internal timers and used to vary the sample rate to achieve a constant number of samples per cycle.

Referring still to FIG. 1, the ground fault sensor 20 feeds a ground fault amplifier 120 and an absolute value circuit 122 which form the ground fault detector circuit 28. The ground fault amplifier 120 essentially amplifies the low level difference in current flow between the line 14 and neutral 18 as detected by the ground fault sensor 20. The absolute value circuit 122 is similar in its operation and function to the absolute value circuit 102 described above in that it essentially turns negative-going signals into positive signals and passes positive-going signals through unchanged.

The line voltage is also conditioned at a circuit 130 and fed to the microcontroller for further analysis and processing. This circuit 130 includes a line voltage divider (not shown) which divides the line voltage to a lower level suitable for further processing, a difference amplifier (not shown) which takes the output of the line voltage divider and level shifts it to circuit ground to be rectified, and an absolute value circuit. The voltage from the difference amplifier (not shown) is fed through the absolute value circuit which has the same configuration and function as described above for the previously described absolute value circuits. The output of signal conditioning circuit 130 is fed to the microcontroller 40.

Referring still to FIG. 1, a watchdog circuit 140 takes a pulse input (Pulse_In) from the microcontroller 40 to check to see if the microcontroller is still active. If no pulses are present on this output from the microcontroller then a trip signal (Trip_Signal') is sent to the trip circuit by the watchdog circuit 140.

As indicated above, FIG. 1 illustrates one embodiment of an application specific integrated circuit for performing the above-described operations. Further details of the construction and operation of the circuit of FIG. 1 are described in the above-referenced copending application, Ser. No. 09/026,193, filed Feb. 19, 1998, which has been incorporated by reference.

Provision of the detector circuit as an ASIC is advantageous, in that it permits the circuitry to be readily incorporated into a variety of environments. This is mainly due to the small size and relatively modest power requirements of the ASIC. That is, this detector circuit can be incorporated not only in panel boards or other distribution apparatus, but could also be located at individual loads. This is true for industrial, as well as and commercial and residential applications. For example, the detector circuit ASIC could be incorporated in electrically powered industrial and/or commercial equipment or machinery, as well as in consumer products such as computers, audiovisual equipment, appliances or the like.

This invention analyzes current waveforms and broadband noise to determine if arcing is present in electrical conductors. A high current arc is identified as a current waveform that has a combination of changes in current (di/dt) and broadband noise (10 kHz to 100 kHz). The controller 40 increments a plurality of counters, which may be implemented in software, in accordance with the input signals received from the ASIC 30. Table 1 summarizes high current arcing characteristic of current waveforms and how firmware counters are incremented. Flow charts of a program that uses the counters to determine if an arc is present are illustrated in FIGS. 3–8 which are described below.

Conditions exist where loads have broadband noise, large (di/dt) and high currents under normal operating conditions. To distinguish between normally noisy load currents and arcing currents, the algorithms looks for different levels of (di/dt) broad band noise, high currents, decaying currents and current aspect ratios*.

Broadband noise is calculated as logically ANDing two or more frequency bands in hardware as described above. If broadband noise is present then pulses are received at the microcontroller input. The pulses are counted every half cycle, stored and then reset to detect broadband noise levels in the next half cycle.

If (peak1>48 A) then check the following:
If(di/dt1>(0.328×peak1) and high_frequency_counter>4 and high frequency noise counter<16)
   increment di/dt_counter
   increment high_frequency_counter
   increment high_current_arc_counter
ElseIf (di/dt1 22 (0.328×peak1))
   increment di/dt_counter
   increment high_current_arc_counter
ElseIf (di/dt1>(0.25×peak1) and high_frequency_counter>4 and high_frequency_noise counter<16)
   increment di/dt_counter
   increment high_frequency_counter
   increment high_current_arc_counter
ElseIf (di/dt1>(0.203×peak1) and high frequency counter>4 and high frequency noise counter<16)

TABLE 1

(each row characterizes an arcing half cycle)

| peak current with aspect ratio* > 2 | (di/dt) (dt** = 500 us) | high frequency broad band noise*** | high current arc counter | (di/dt) count | high frequency counter |
|---|---|---|---|---|---|
| >48A | >0.328 × peak current | not required | increment | increment | unchanged |
| >48A | >0.328 × peak current | present | increment | increment | increment |
| >48A | >0.203 × peak current | required | increment | unchanged | increment |
| >48A | >0.25 × peak current | required | increment | increment | increment |

*Aspect ratio is the area divided by the peak for one half cycle. Area is the sum of 32 samples for one half cycle.
**dt is the time between every other sample of the current waveform. This sample time varies dynamically with the line frequency (60 ± 4 Hz) to get better coverage of the current waveform.
***High frequency broadband noise is the presence of broadband noise during the first 20 half cycles on power-up of the module with a load connected and turned on, and normal operation due to noisy loads at steady state (currents below 48A peak).

Arcing and startup current waveforms are analyzed by the controller using the algorithms described in the following description and the flow charts in FIGS. 3–8.

The firmware contains the following counters and other variables:
   di/dt1 (holds the maximum di/dt one half cycle ago)
   di/dt2 (holds the maximum di/dt two half cycles ago)
   di/dt3 (holds the maximum di/dt three half cycles ago)
   di/dt4 (holds the maximum di/dt four half cycles ago)
   di/dt_counter (holds the integer number of times di/dt count has been incremented, specified in TABLE 1)
   peak1 (holds the peak current of one half cycle ago)
   peak2 (holds the peak current of two half cycle ago)
   peak3 (holds the peak current of three half cycle ago)
   peak4 (holds the peak current of four half cycle ago)
   peak5 (holds the peak current of five half cycle ago)
   high_current_arc_counter (holds the integer number of times an arcing half cycle was detected from TABLE 1)
   high_frequency_counter (holds the integer number of counts of high frequency of the previous half cycles)
   high_frequency_noise_counter (holds the integer number of high frequency counts during startup or steady state (currents less then 48 A))
   missing_half cycle (true when non-arcing half cycle follows arcing half cycle)
   slow_rise (holds the value of peak1—di/dt1)
   peak_ground_fault (holds the peak ground fault current of last half cycle) The counters described above are incremented and cleared in the following way:

increment high_frequency_counter
   increment high_current_arc_counter
If no arcing half cycle in 0.5 seconds after last arcing half cycle, then clear all counters
A line to neutral arc or ground fault arc is present under the following conditions of the above firmware counters:
If (ground fault>threshold)
If (peak currents>35 A for 3 half cycles and missing_half cycle is true and di/dt_counter>1 and high_current_arc_counter>1)
If (peak currents>35 A for 4 half cycles and missing_half cycle is true and high current_arc_counter>2)
If (peak currents>35 A for 5 half cycles and missing_half cycle is true and high_current_arc_counter>3)
If (peak currents>35 A for 5 half cycles and high current_arc_counter>3 and di/dt1>di/dt3 and di/dt_counter>2)
If (peak currents>35 A for 5 half cycles and high_current_arc_counter>3 and di/dt1>di/dt3 and high_frequency_counter>2 and di/dt_counter>1)
If (peak currents>35 A for>5 half cycles and<9 half cycles and high_current_arc_counter>3 and missing_half cycles is true)
If (peak currents>35 A for>5 half cycles and<9 half cycles and high_current_arc_counter>3 and di/dt_counter>3)
If (peak currents>35 A for>5 half cycles and<9 half cycles and high_current_arc_counter>3 and high_frequency_counter>1 and di/dt_counter>2)
If (peak currents>35 A peak for>5 half cycles and<9 half cycles and high_current_arc_counter>3 and high_frequency_counter>2 and di/dt_counter>1)

If (high_current_arc>6)
  Start-up Algorithms:
If (peak1 to peak4>35A and missing_half cycle=false) then check the following:
If (((peak1<(peak3−7A)) and (peak1<peak2)) and ((peak2<peak3) and (peak2<peak4−7A)))
    tungsten lamp startup, clear the following counters
      high_current_arc_counter
      di/dt_counter
      high_frequency_counter
ElseIf((peak3>peak1) and (peak5>peak3) and (di/dt1<peak1/2) and (di/dt2<peak2/2) and (di/dt3<peak3/2) and ((di/dt5+1.4A)>=di/dt3) and ((di/dt3+1.4A)>=di/dt1) and (slow_rise1>48A))
    inductive load startup, clear the following counters
      di/dt_counter
      high_frequency_counter Note: The numerical values in the above expressions are selected for residential applications. However, specific numerical values, current levels and counter values are not limited to the above specifications, but may vary for other applications.

Figure 9:
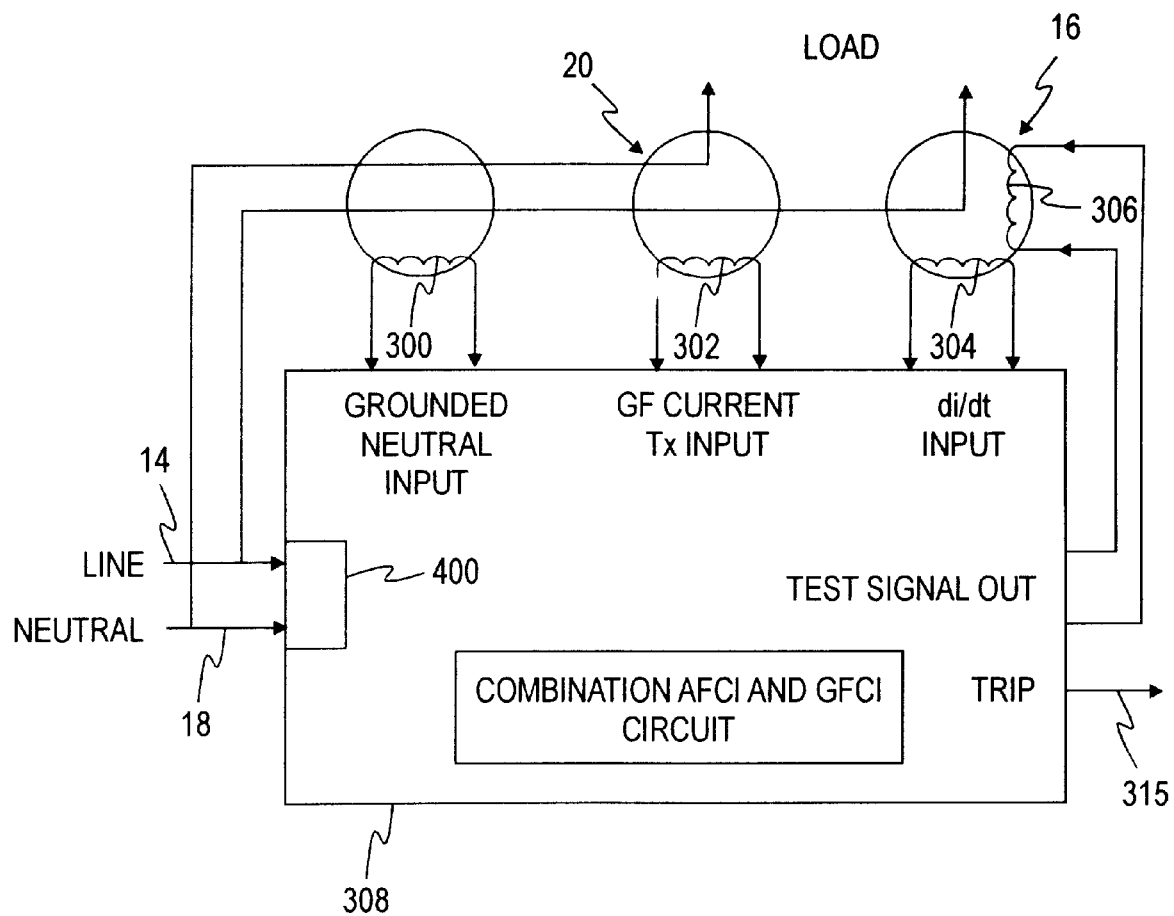
FIGS. 9 and 10 are block diagrams of an arc fault detector system and ground fault sensor in accordance with the present invention.
Figure 10:
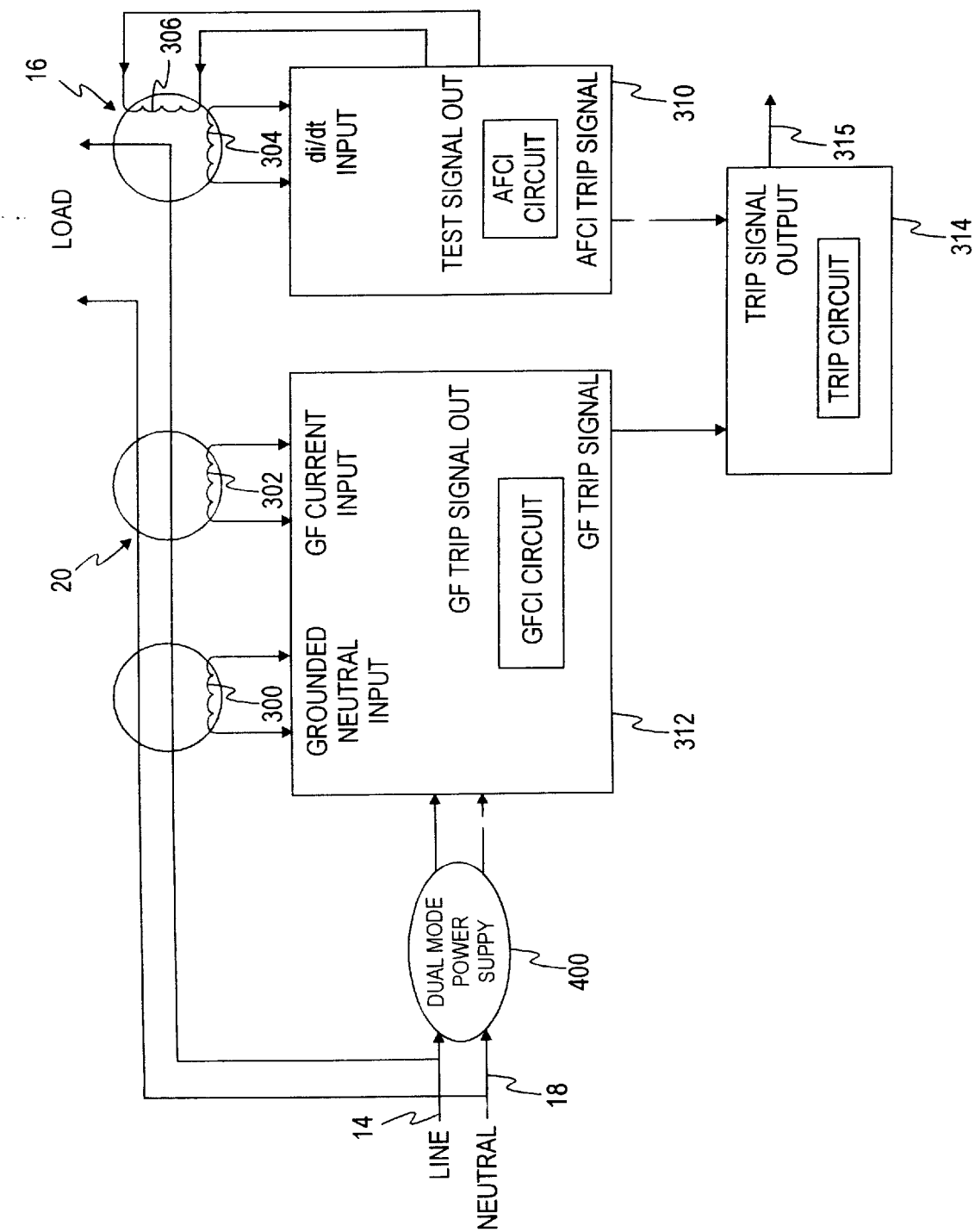

As further illustrated in FIGS. 9 and 10, the ground fault sensor 20 comprises a ground fault current sensing coil having an output winding 302. A ground fault neutral sensor coil having an output winding 300 is also shown in FIGS. 9 and 10. The di/dt sensor 16 is a toroidal coil having an annular core surrounding the line conductor 14, and a di/dt winding 304 and a self-test winding 306. The respective windings 300, 302, 304 form like-designated inputs to arcing fault and ground fault circuit 308 or separate circuits 310 and 312.

FIG. 9 depicts the arcing fault circuits and ground fault circuits on one integrated circuit 308, while FIG. 10 depicts the arcing fault circuits and self-test circuit on a first integrated circuit 310 with the ground fault circuits on a second integrated circuit 312. Although a trip circuit block 314 in FIG. 10 is separate from the ground fault detector system 312 and arcing fault detector system 310 blocks, it may be integrated into either block.

In an effort to conserve space, both chip-on-board technology and resistor-on-board technology may be implemented in the arcing fault detector system 10 of the present invention. The chip-on-board technology takes the silicon die of a chip, places it on a circuit board and covers it with a plastic-like coating. This saves space over the traditional method of using a standard package. A similar idea is to use ball grid array (BGA) packages. These packages save as much space as the chip-on-board technology, but have the advantage of not requiring a clean room. They do, however, require X-ray equipment to inspect the chips. Many manufacturers of silicon chips, including SVI Public Co., Ltd., and Argo Transdata Corp., are now supporting BGA's.

Resistor-on-board technology is a screening process where standard resistors are screened onto a circuit board. Although screened-on resistors are not smaller length-wise or width-wise, they are flat. Therefore, other components can be placed over them. Multek (a DII company) manufactures boards with screened-on resistors.

Figure 11:
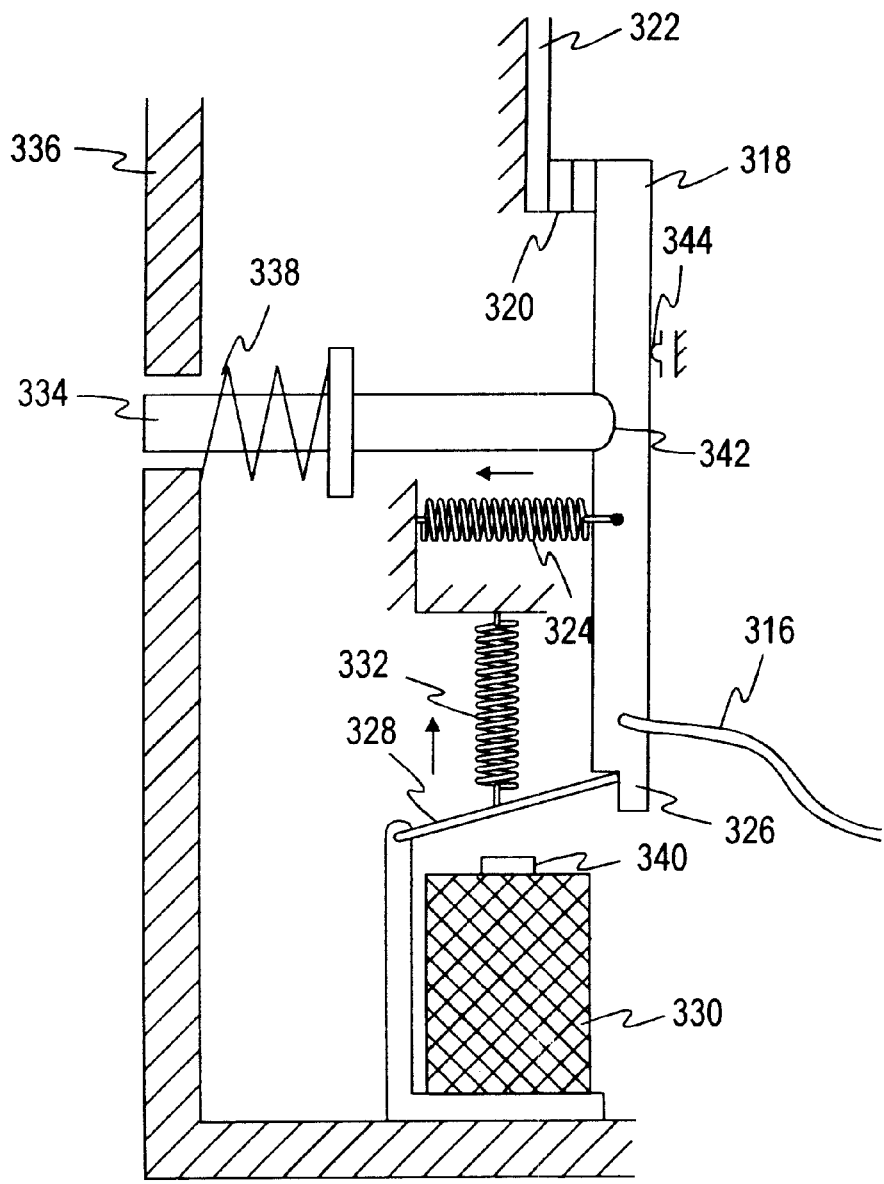
FIG. 11 is a prior art tripping mechanism in the closed position.
Figure 12:
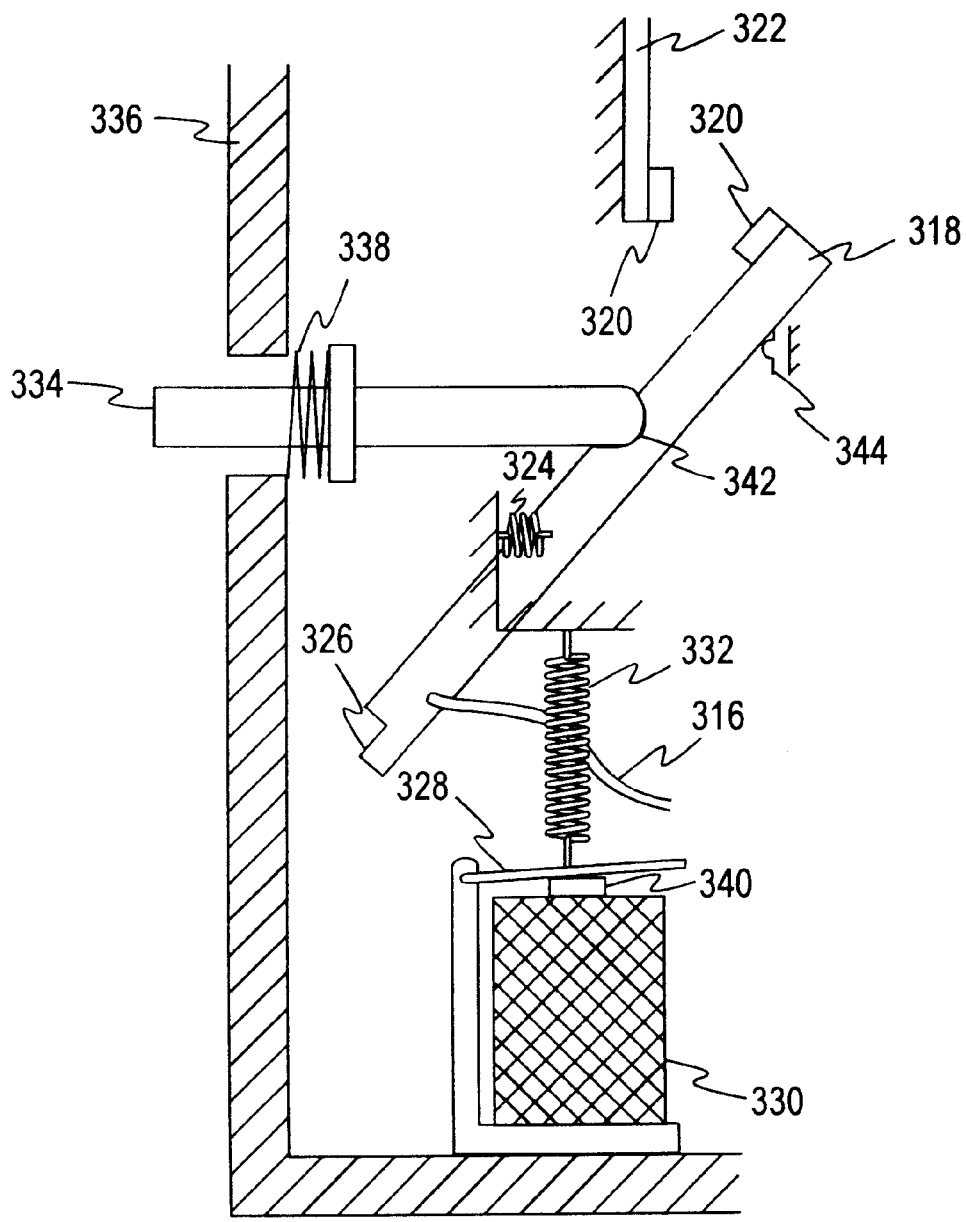
FIG. 12 is a prior art tripping mechanism in the open position.

Conventional tripping mechanisms for ground fault circuit interrupters (GFCI) in receptacles may be implemented in conjunction with the arcing fault detector system 10. For example, FIGS. 11 and 12 illustrate a prior art GFCI receptacle tripping mechanism. FIG. 11 illustrates a tripping mechanism for a GFCI and/or AFCI receptacle in the closed position where current can flow though the receptacle to the load 50. The current originates through a pigtail or other flexible conductor 316, through a movable contact arm 318, through mating contacts 320 and to a stationary contact arm 322. The contacts 320 are held closed by a spring 324, while one end of the movable contact arm 318 is supported by and pivoted about a latch 326. A clapper arm 328 is held biased away from a trip coil 330 by a spring 332 with sufficient force to support the movable contact arm 318 in the latched position. A reset and trip indicating button 334 is normally biased into a receptacle housing 336 by a spring 338.

When the trip coil 330 is energized by turning on an SCR or equivalent to short it across the line voltage, the clapper 328 is momentarily pulled to the closed position against a pole piece 340, thereby releasing the latch 326. As seen in FIG. 12, when the clapper 328 closes and removes the support from the latch end of the movable contact arm 318, the arm 318 is free to rotate about the end of the reset button 334 at end 342. The arm 318 then rotates until it contacts stationary surface 344 and opens the contacts 320 to disconnect the load 50 from the line 14. The trip coil 330, being connected to the load side of the contacts 320, is de-energized when the contacts 320 open.

Although only one set of contacts 320 is shown in FIGS. 11 and 12, a second set of contacts and contact arms are typically provided to open both the line conductor 14 and neutral conductor 18.

In the tripped state, the trip indicator 334 is biased out of the receptacle housing 336, indicating that the device has tripped until the spring 338 is fully compressed. To reset the mechanism to its closed state, the reset button 334 is pushed into the housing 336. This causes the contact arm 318 to pivot about the stationary surface 344, raising the latch end of the contact arm 318 such that spring 332 pulls the clapper 328 back into the latched position. The reset button 334 is then released and the contacts 320 close, while latch 326 once again supports the contact arm 318.

Figure 13:
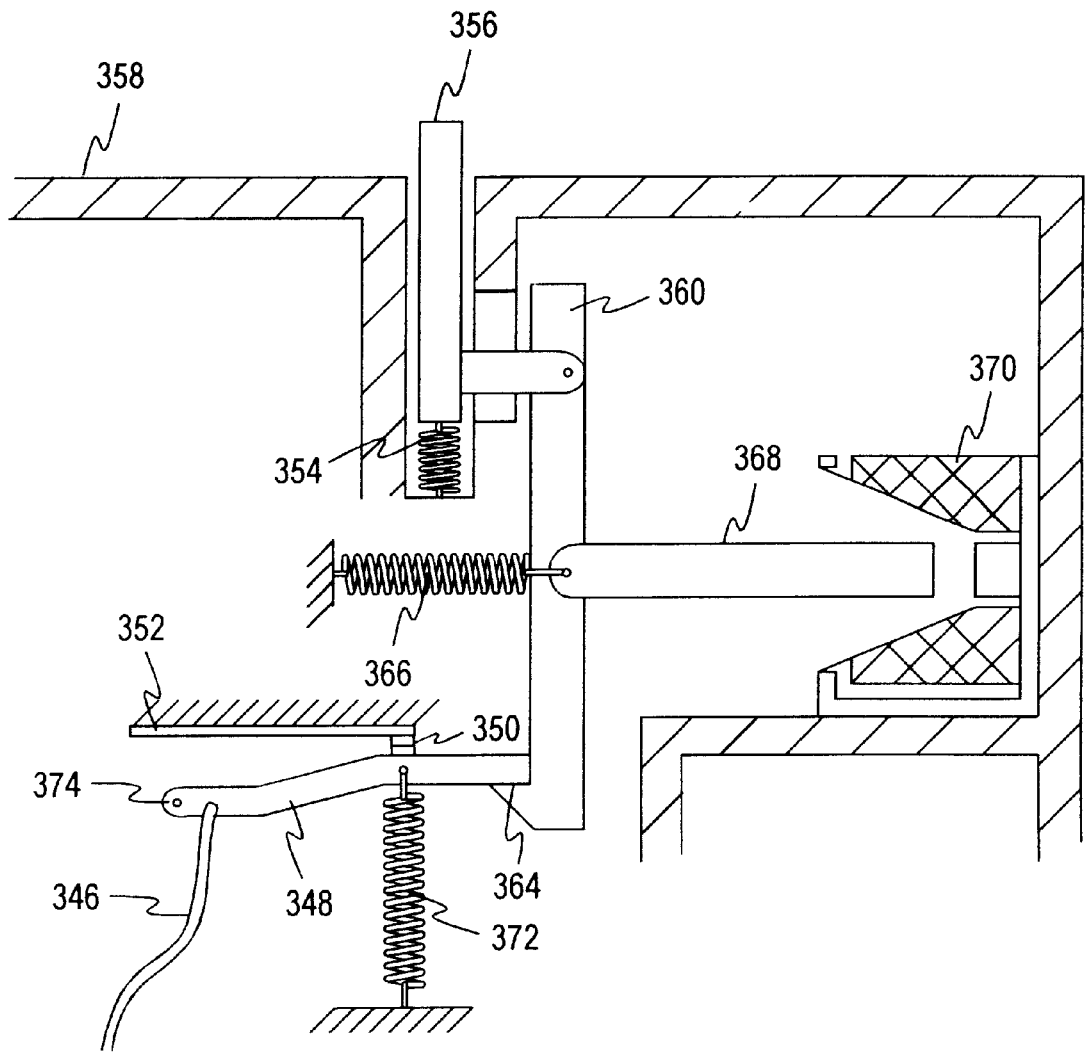
FIG. 13 is a prior art tripping mechanism in the closed position.
Figure 14:
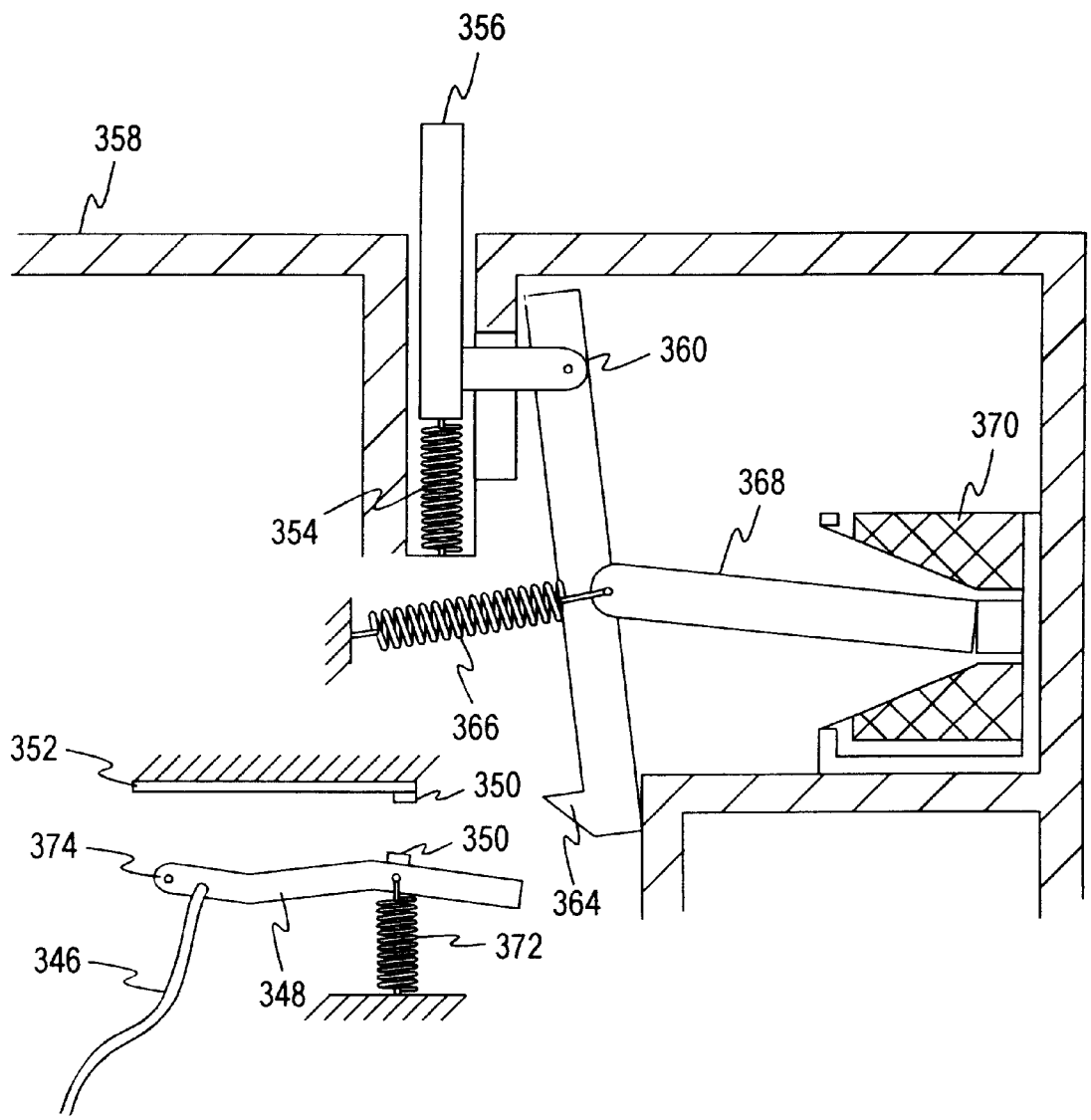
FIG. 14 is a prior art tripping mechanism in the open position

FIGS. 13 and 14 illustrate an alternate prior art embodiment for a GFCI tripping mechanism. In the closed position, as shown in FIG. 13, when current flows to the load 50 (see FIG. 1), the current path is through a pigtail or other flexible connector 346, through a movable contact arm 348, through mating contacts 350 and to a stationary contact arm 352. A spring 354 forces a trip indicator/reset button 356 in a direction outward from the receptacle housing 358. The trip indicator/reset button 356, in turn, pushes on lever 360 in a direction to force the contacts 350 to close. A notch on the lever 360 forms a latch 364 which mates with the contact arm 348. A plunger bias spring 366 biases the plunger 368 out of a trip coil 370 and holds the lever 360 against the movable contact arm 348 in a latched position. A spring 372 biases the movable contact arm 348 toward the open position, however, latch 364 holds the contacts 350 closed.

When the trip coil 370 is energized by turning on an SCR or equivalent to short the trip coil 370 across the line voltage, the plunger 368 is drawn into the trip coil 370 against the plunger bias spring 366, as shown in FIG. 14, and moves the lever 360 so that the latch 364 is released. With the latch 364 released, the movable contact arm 348 is free to rotate about a pivot 374 under the influence of the spring 372. The contacts 350 are thereby separated, disconnecting the receptacle load 50 from the line. The trip coil 370, being connected to the load side of the contacts 350, is de-energized when the contacts 350 open.

Although only one set of contacts 350 is shown in FIGS. 13 and 14, a second set of contacts and contact arms are typically provided to open both the line conductor 14 and neutral conductor 18.

In the tripped state, as shown in FIG. 14, the trip indicator/reset button 356 extends from the receptacle housing 358, being forced outward by spring 354, to indicate that the device has tripped. To reset the mechanism to its closed state, the trip indicator/reset button 356 is pushed into the housing 358. This causes the lever 360 to move in a direction toward the movable contact arm 348. With the trip coil 370 de-energized, the plunger 368 and lever 360 are biased away from the trip coil 370 by the plunger bias spring 366. As the latch 364 on the end of the lever 360 moves past the latch surface on the movable contact arm 348, the latch 364 is engaged. After the reset button 356 is released, the spring 354 once again forces the contacts 350 together, as described above.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. An arcing fault and ground fault protection system, comprising:
    at least one sensor responsive to a current flowing in an electrical circuit for developing a corresponding sensor signal;
    a fault detector responsive to said sensor signal for detecting arcing faults and ground faults and producing corresponding output signals;
    a dual-mode power supply connected to said electrical circuit and said detector for supplying a predetermined output voltage to said detector, said power supply having first and second modes with the first mode supplying said predetermined output voltage more quickly than, but drawing more supply current than, said second mode, and
    a switch for switching said power supply from said first mode to said second mode.

2. The arcing fault and ground fault detection system of claim 1 wherein said first mode of said power supply reaches steady state faster than said second mode.

3. The arcing fault and ground fault detection system of claim 1 wherein said detector includes a microcontroller receiving power from said power supply.

4. The arcing fault and ground fault detection system of claim 3 wherein said switch sets said power supply to said first mode until said second mode reaches steady state, and said switch sets said power supply to said second mode after said second mode reaches steady state.

5. The arcing fault and ground fault detection system of claim 1 which includes a current-limiting resistor for limiting the current flow in said power supply in said second mode, and means for bypassing said current-limiting resistor in said first mode.

6. The arcing fault and ground fault detection system of claim 1 wherein said detector produces a trip signal in response to a determination that an arcing fault is present, said assembly further comprising:
    a tripping mechanism which stops the current from flowing in the electrical circuit in response to said trip signal.

7. The arcing fault and ground fault detection system of claim 6 further comprising a ground fault sensor which detects a difference in current flow between a line conductor and a neutral conductor of the electrical device to determine whether a ground fault is present, wherein said detector also produces said trip signal in response to a determination that a ground fault is present.

8. An arcing fault and ground fault detection system, comprising:
    a sensor which detects a current flowing in an electrical circuit and develops a corresponding sensor signal;
    a broadband noise circuit which determines the presence of broadband noise in said sensor signal and produces a corresponding output signal;
    a controller which processes said sensor signal and said output signal in a predetermined fashion to determine whether an arcing fault is present in said electrical circuit;
    a dual-mode power supply connected to said electrical circuit and said broadband noise circuit and said controller for supplying a predetermined output voltage thereto, said power supply having first and second modes with the first mode supplying said predetermined output voltage more quickly than, but drawing more supply current than, said second mode, and
    a switch for switching said power supply from said first mode to said second mode.

9. The arcing fault and ground fault detection system of claim 8 wherein said first mode of said power supply reaches steady state faster than said second mode.

10. The arcing fault and ground fault detection system of claim 9 wherein said switch sets said power supply to said first mode to supply power to said broadband noise circuit and said controller until said power supply reaches steady state, and said switch sets said power supply to said second mode to supply power to said broadband noise circuit and said controller after said second power supply reaches steady state.

11. The arcing fault and ground fault detection system of claim 8 which includes a current-limiting resistor for limiting the current flow in said power supply in said second mode, and means for bypassing said current-limiting resistor in said first mode.

12. The arcing fault and ground fault detection system of claim 8 wherein said controller produces a trip signal in response to a determination that an arcing fault is present, said assembly further comprising:
    a tripping mechanism which stops the current from flowing in the electrical circuit in response to said trip signal.

13. The arcing fault and ground fault detection system of claim 12 further comprising a ground fault sensor which detects a difference in current flow between a line conductor and a neutral conductor of the device to determine whether a ground fault is present, wherein said controller also produces said trip signal in response to a determination that a ground fault is present.

14. A method of powering up an arcing fault and ground fault detection system, comprising:
    supplying power to said arcing fault protection assembly using a first power supply; and
    switching the power to said arcing fault protection assembly to a second power supply, wherein said first power supply reaches steady state faster than said second power supply.

15. The method of claim 14 wherein said power is switched after said second power supply reaches steady state.

16. A method of powering up an arcing fault and ground fault detection system, comprising:
    detecting a current flowing in an electrical circuit and developing a corresponding sensor signal;

determining the presence of broadband noise in said sensor signal and producing a corresponding output signal;

processing said sensor signal and said output signal in a predetermined fashion to determine whether a fault is present in said electrical circuit; and supplying power to said system in a first mode and then switching to a second mode, said first mode reaching steady state faster than said second mode.

17. The method of claim 16, wherein current from said power supply in said first mode is greater than the current from said power supply in said second mode.

18. The method of claim 16 wherein said system produces a trip signal in response to a determination that an arcing fault is present, said method further comprising:

stopping the current from flowing in the electrical circuit in response to said trip signal.

19. The method of claim 18 further comprising detecting a difference in current flow between a line conductor and a neutral conductor of the electrical circuit to determine whether a ground fault is present, and producing said trip signal in response to a determination that a ground fault is present.

20. An arcing fault and ground fault protection method, comprising:

developing at least one sensor signal in response to a current flowing in an electrical circuit;

detecting arcing faults and ground faults and producing corresponding output signals in response to said sensor signal;

supplying a predetermined output voltage to said detector in a first mode that supplies said predetermined output voltage more quickly than, but drawing more supply current than, a second mode, and switching said power supply from said first mode to said second mode.

* * * * *